G. MILLER.
WAGON BOX ATTACHMENT.
APPLICATION FILED MAR. 23, 1916.

1,196,378. Patented Aug. 29, 1916.

2 SHEETS—SHEET 1.

Inventor

George Miller

Witnesses

H. Woodard by A. B. Willson & Co.

Attorneys

THE NORRIS PETERS CO., PHOTO-LITHO., WASHINGTON, D. C.

G. MILLER.
WAGON BOX ATTACHMENT.
APPLICATION FILED MAR. 23, 1916.

1,196,378.

Patented Aug. 29, 1916.

2 SHEETS—SHEET 2.

Inventor
George Miller

Witnesses
H. Woodard
[illegible]

by A. B. Willson & Co.
Attorneys

THE NORRIS PETERS CO., PHOTO-LITHO., WASHINGTON, D. C.

UNITED STATES PATENT OFFICE.

GEORGE MILLER, OF ALGONA, IOWA.

WAGON-BOX ATTACHMENT.

1,196,378. Specification of Letters Patent. Patented Aug. 29, 1916.

Application filed March 23, 1916. Serial No. 86,220.

*To all whom it may concern:*

Be it known that I, George Miller, a citizen of the United States, residing at Algona, in the county of Kossuth and State of Iowa, have invented certain new and useful Improvements in Wagon-Box Attachments; and I do declare the following to be a full, clear, and exact description of the invention, such as will enable others skilled in the art to which it appertains to make and use the same.

This invention relates generally to vehicles, and more particularly to an attachment for wagon boxes.

The primary object of the invention is to provide an extension for one of the sides of a wagon box which is adapted to prevent articles from being thrown over the wagon by deflecting them into the box.

Another object of the invention is to provide an extension of this character which can be easily applied to and detached from a wagon box.

A further object is to provide adjustable braces for securing and bracing the extension.

A still further object is to provide a device of this character which will be simple, durable and strong in construction, efficient and reliable in operation, and well adapted to the purpose for which it is designed.

With these and other objects in view, the invention consists of certain novel features of construction, and the combination and arrangement of parts as will be hereinafter fully described and claimed.

Figure 1:
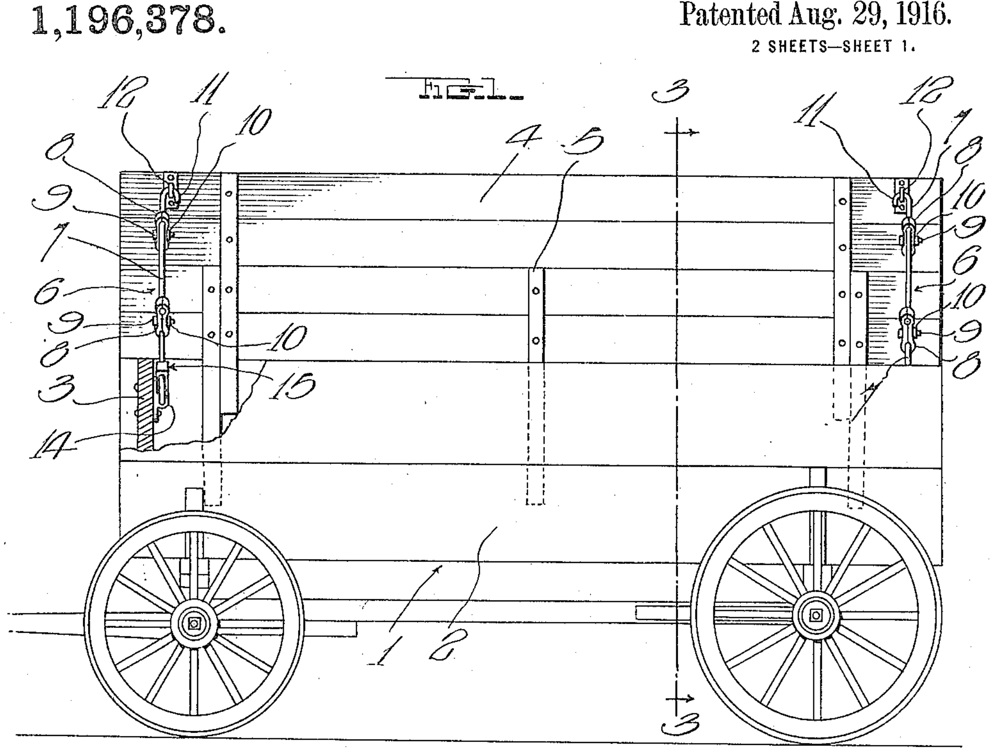
Figure 2:
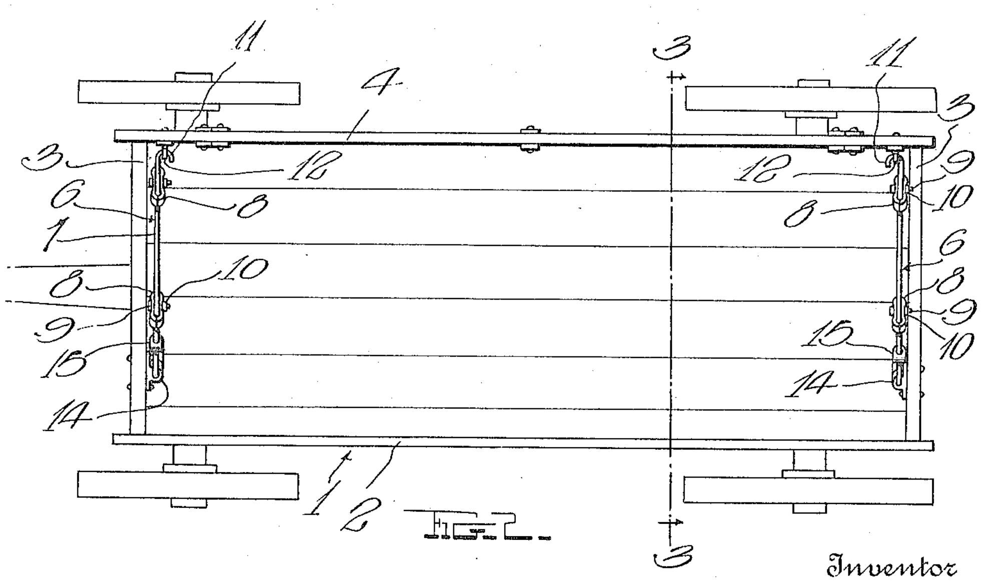
Figure 3:
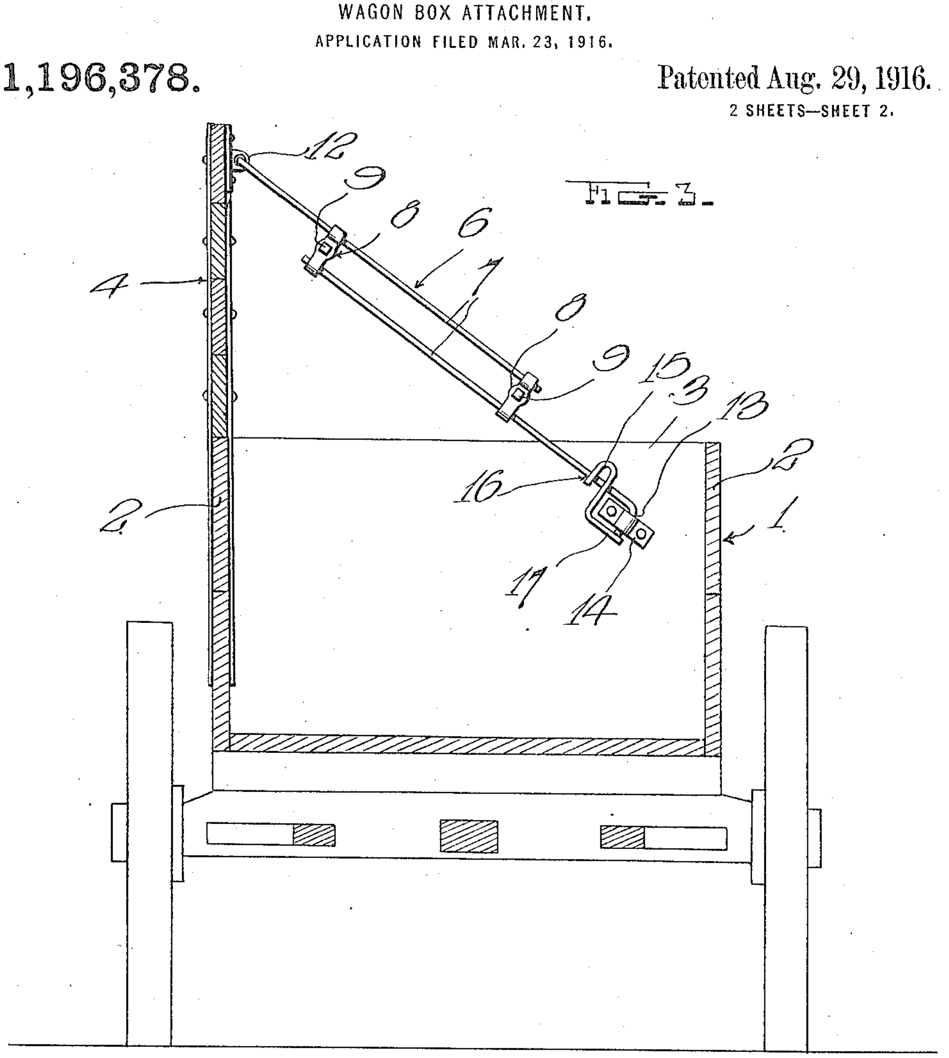
Figure 4:
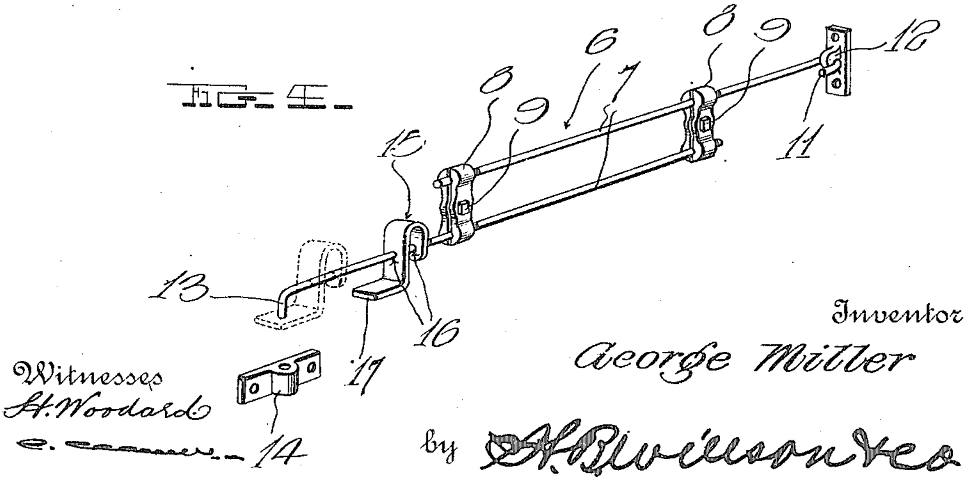

In the accompanying drawings in which similar reference characters designate like parts throughout the several views Figure 1 is a side elevation partly in section of a farm wagon having an attachment constructed in accordance with this invention applied thereto; Fig. 2 is a top plan view of the same; Fig. 3 is a transverse sectional view taken on the plane of the lines 3—3 of Figs. 1 and 2; and Fig. 4 is a perspective view of one of the braces detached.

Referring more particularly to the drawings, the reference character 1 designates the wagon box of an ordinary farm wagon having upright sides 2 and upright ends 3. Extending upwardly from one of the sides 2 is an extension 4, the latter being constructed in any convenient manner and provided with guides 5 arranged on its opposite sides for engagement with the side 2 of a wagon box, thereby preventing relative lateral movement of these parts. The ends of the extension 4 at the upper edge thereof are braced by suitable diagonal braces 6, now to be described.

The braces 6 comprise a pair of parallel rods 7 having their inner ends clamped together by two-part clamps 8, through the sections of which extend clamping bolts 9 having nuts 10 on their threaded ends. It is to be understood that these clamps 8 maintain the rods 7 in their spaced parallel relation. By loosening the nuts 10 the rods 7 may be adjusted longitudinally relative to each other. The upper ends of the upper rods 7 are bent upon themselves to provide hooks 11 which are adapted to be engaged with eyes 12 secured to the upper edge of the extension 4 at the ends thereof. The lower ends of the lower rods 7 are bent at right angles, and these right angular portions 13 are extended through suitable eyes or keepers 14 arranged on the inner faces of the ends 3 of the wagon and at the sides thereof remote from the extension 4.

Slidable on the lower rods 7 are latches for preventing the right angular bent portions 13 from becoming disengaged from the keepers 14. These latches are composed of U-shaped members 15 having alined apertures 16 in the arms thereof for insertion therethrough of the rods 7, one of said arms being extended longer than the other and provided with lugs 17 extending laterally at right angles from the free ends thereof. These lugs 17 are adapted to be disposed in alinement with the right angular bent portions 13 of the lower rods 7, thereby preventing the same from becoming disengaged from the keepers 14, as will be readily understood without further description.

From the foregoing description, taken in connection with the accompanying drawings, it will be seen that the device may be readily and easily applied to or detached from an ordinary wagon box. A wagon box provided with an attachment of this character will be found to be very useful for many purposes such as, for instance, in loading the wagon with ears of corn or other objects from the ground, the ears may be thrown carelessly and the extension would deflect them into the box and thus prevent them from being thrown completely over the same.

It is to be understood that the drawings are merely illustrative of one form of the present invention, and as various minor changes in form and proportion may be resorted to without departing from the spirit of the invention, I do not wish to be limited to this construction other than as set forth in the appended claims.

I claim:—

1. The combination with a wagon box, of a detachable extension for one of the sides of said box, eyes arranged at the ends of said extension and near the upper edge thereof, additional eyes arranged along the upper edge of the remote sides of the ends of said box, pairs of parallel rods having hooks at their upper and lower ends for engagement with said eyes, and clamps engaging the inner ends of said rods for maintaining the same in their spaced parallel relation.

2. The combination with a wagon box, of a detachable extension for one of the sides of said box, eyes arranged at the ends of said extension and near the upper edge thereof, additional eyes arranged along the upper edge of the remote sides of the ends of said box, pairs of parallel rods having hooks at their upper and lower ends for engagement with said eyes, two-part clamps engaging the inner ends of said rods, and bolts extending through the sections of said clamps for locking said rods in adjusted positions.

3. The combination with a wagon box, of a detachable extension for one of the sides of said box, eyes arranged at the ends of said extension and near the upper edge thereof, keepers arranged along the upper edge of the remote sides of the ends of said box, diagonal braces having their upper ends bent upon themselves for engagement with said eyes, the lower ends of said braces being bent at right angles and extended through said keepers, and latches slidable on the lower ends of said braces for preventing the same from becoming disengaged from said keepers.

4. The combination with a wagon box, of a detachable extension for one of the sides of said box, eyes arranged at the ends of said extension and near the upper edge thereof, keepers arranged along the upper edge of the remote sides of the ends of said box, diagonal braces having their upper ends bent upon themselves for engagement with said eyes, the lower ends of said braces being bent at right angles and extended through said keepers, U-shaped members having alined apertures in the arms thereof for slidable engagement with the lower ends of said braces, and lugs extending laterally from one of the arms of said members and disposed in alinement with the right angular bent portions of the lower ends of said braces.

In testimony whereof I have hereunto set my hand in presence of two subscribing witnesses.

GEORGE MILLER.

Witnesses:
GENTRY GALBREATH,
E. J. VAN NESS.

Copies of this patent may be obtained for five cents each, by addressing the "Commissioner of Patents, Washington, D. C."